(12) United States Patent
Leinfellner et al.

(10) Patent No.: US 7,870,479 B2
(45) Date of Patent: Jan. 11, 2011

(54) ELECTRONIC IN-APPLICATION POSTCARDS

(75) Inventors: Richard Leinfellner, Brighton (GB); Karl Fitzhugh, West Sussex (GB); Jeffrey Gamon, West Sussex (GB)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 12/366,461

(22) Filed: Feb. 5, 2009

(65) Prior Publication Data
US 2009/0313341 A1 Dec. 17, 2009

Related U.S. Application Data

(63) Continuation of application No. 09/495,622, filed on Feb. 1, 2000, now abandoned.

(51) Int. Cl.
*G06F 17/00* (2006.01)
(52) U.S. Cl. ............... 715/226; 715/201; 715/221; 715/224; 715/230
(58) Field of Classification Search .......... 715/200, 715/201, 202, 203, 221, 222, 224, 225, 226, 715/230, 231, 233, 273, 274
See application file for complete search history.

(56) References Cited

U.S. PATENT DOCUMENTS

| | | | |
|---|---|---|---|
| 5,779,549 A * | 7/1998 | Walker et al. | 463/42 |
| 6,094,277 A * | 7/2000 | Toyoda | 358/1.15 |
| 6,224,486 B1 * | 5/2001 | Walker et al. | 463/42 |
| 6,264,562 B1 * | 7/2001 | McSheffrey et al. | 463/42 |
| 6,280,325 B1 * | 8/2001 | Fisk | 463/19 |

(Continued)

OTHER PUBLICATIONS

SnagIt help system Version 4.3, TechSmith Corporation, Nov. 14, 1998, pp. 1-7.*

(Continued)

*Primary Examiner*—Stephen S Hong
*Assistant Examiner*—Gregory J Vaughn
(74) *Attorney, Agent, or Firm*—Townsend and Townsend and Crew LLP; Gerald T. Gray

(57) ABSTRACT

A system, method and apparatus are disclosed for generating a composite message representative of an application experience to be sent to a remote recipient by receiving a user input selecting multimedia information provided by an application, generating a message form from within the application to receive message information, combining the selected multimedia information and the message information into a composite message, and sending the composite message to the intended recipient. A composite message is created by any or all of the following: capturing a current image, linking an associated audio file to the message, removing extraneous user interfaces from the image, scaling the image to a more appropriate display size, adding corporate logo or other identifying information to the message, and receiving text to be transmitted to the remote recipient. The electronic mail address of the sender is automatically retrieved and placed in the message form, the recipient's name and address are received, and the address information, message text, and multimedia information are displayed to the sender to allow the sender to decide whether or not to send the composite message. A predetermined third party can be notified of the identity of the recipient of the composite message to use the information to market the application to the recipient if the recipient is not currently an owner of the application.

7 Claims, 12 Drawing Sheets

U.S. PATENT DOCUMENTS

| | | | |
|---|---|---|---|
| 6,354,939 B1 * | 3/2002 | Morita et al. | 463/1 |
| 6,400,378 B1 * | 6/2002 | Snook | 715/716 |
| 6,424,996 B1 * | 7/2002 | Killcommons et al. | 709/206 |
| 6,500,069 B1 * | 12/2002 | Ohba et al. | 463/31 |
| 7,076,730 B1 * | 7/2006 | Baker | 715/210 |

OTHER PUBLICATIONS

Abelson et al., Messaging Application Programming Interface, accessed from the web on Jul. 12, 2010, Wikipedia, 3 pages.*

* cited by examiner

ELECTRONIC IN-APPLICATION POSTCARDS

CROSS-REFERENCES TO RELATED APPLICATIONS

This application is a continuation of U.S. patent application Ser. No. 09/495,622, filed Feb. 1, 2000 which claims the benefit of U.S. Provisional Application No. 60/146,433 filed Jul. 29, 1999, the disclosures of which are incorporated herein by reference in their entirety.

BACKGROUND

1. Field of Invention

The present application relates to electronic messaging applications, specifically to electronic messaging systems invoked within the context of an application.

2. Background of the Invention

Electronic computer games are becoming very sophisticated interactive applications. One user's experience in a game may be very different than other users' experience because of the level of sophistication and variety of game experiences provided even in a single game. For example, while playing an electronic game, players may overcome obstacles, visit different lands, meet and talk to different people, and thus different players may have completely different experiences while playing the same game. Much of the entertainment value of playing electronic games is derived from discussing the experience with other players of the game and other friends who may not be players of the game. However, currently the only method to relate an individual gaming experience in any significant detail is to relate the experience orally. Alternatively, sophisticated computer users may printout a screen shot of a particular game image to send to others.

However, screen shots are very difficult to use. Locating the image file after capture requires a user with some computer sophistication, and sending the image file require the use of a third party electronic mail program. Moreover, third party electronic mail programs often cannot be activated while a game is being executed, and therefore in order to send the message the user must exit the game, locate the screen shot image file, execute the mail program, create a new message, and then attach the image to the message. Users who do not have third party electronic mail programs cannot use the screen shot method at all, and for most other users the screen shot method is too cumbersome to be a viable solution to this problem. Screen shots are also limited to images, and cannot capture other types of media produced by the game. Further, screen shots cannot easily be modified or customized to suit user preferences. For example, screen shots are unable to distinguish between desired content displayed on a screen and undesirable content.

Therefore, a system, method and apparatus are needed in which electronic messages can be sent by a user from within a game or other application that captures the experience of a moment within the game, provides the ability to transmit that experience to others, and provides a user-friendly format to transmit the experience, without requiring exiting the game, using a third party electronic mail program to send the message, and does not require a user to possess an advanced level of computer sophistication.

SUMMARY OF INVENTION

In accordance with the present invention a composite message is generated representative of an application experience. This composite message is formed by combining a user input selecting multimedia information provided by an application and message information received from a message form generated from within the application. The composite message is then sent to the intended recipient(s) specified by the user through a network connection. In a preferred embodiment, a composite message is created by any or all of the following: capturing a current screen image, linking an associated audio file to the message, removing extraneous graphical data of an application and/or user interfaces from the image, scaling the image to desired display size, adding corporate logo or other identifying information to the message, and receiving text to be transmitted to a remote recipient.

In a further embodiment, the electronic mail address of the sender is automatically retrieved and placed in a message form generated internally in the application module, the recipient's name and address are received, and the address information, message text, and multimedia information are displayed to the sender to allow the sender to decide whether or not to send the composite message. Upon sending the composite message, the normal execution of the application is resumed. In a further embodiment, the system also determines if the user is currently connected to a network, and initiates the connection if the user is not connected. The system can also notify the sender when the recipient has received the message during the execution of the application.

Thus, the present invention provides an experience representation that does not require exiting the application from which the experience is desired to be captured, does not require a third party electronic mail program to send the message, and requires little computer sophistication on the part of the user. Moreover, the present invention combines customizable, alterable multimedia information with a message in a user-friendly format and delivers the message quickly and reliably to an intended recipient.

In an alternate embodiment, the present invention notifies a predetermined third party of the identity of the recipient of the composite message. The third party can use the information to market the application or other products/services, to the recipient if the recipient is not currently an owner of the application, or purchaser of the other products or services.

DETAILED DESCRIPTION OF THE PREFERRED EMBODIMENTS

Figure 1:
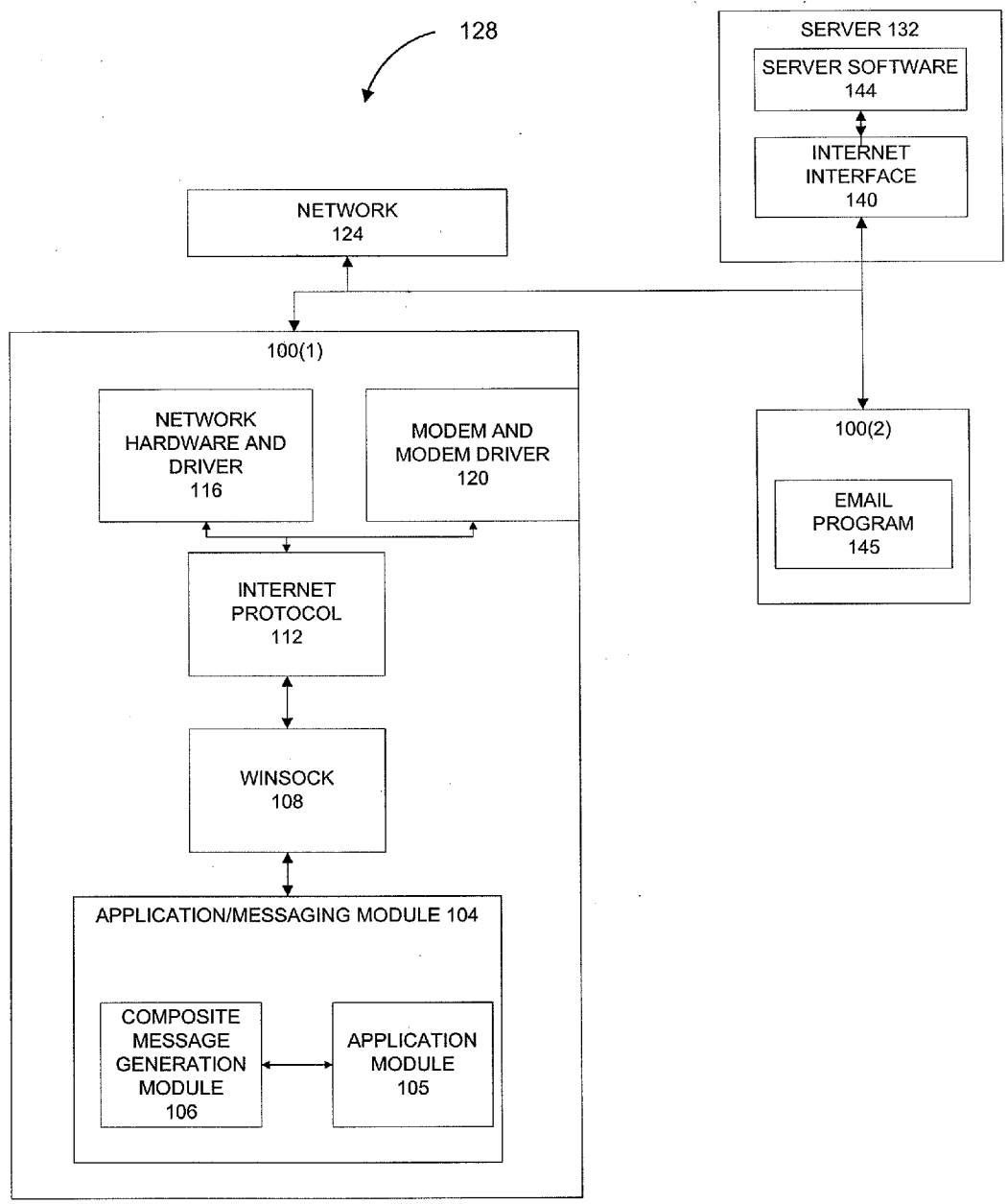
FIG. 1 is a block diagram illustrating a network connecting a sender of a composite message to a recipient.

FIG. 1 is a block diagram illustrating a system 128 connecting a sender of a composite message in accordance with the present invention to a recipient through network 124. In accordance with such system 128, there is provided computers 100 communicatively coupled by a network 124, such as the internet, to one or more computer servers 132. Although two computers 100 are shown, there is no physical limit to the number of computers 100 that may be connected to the network 124 at one time. A computer 100(1) is used by a sender to execute an application/messaging module 104. The application messaging module 104 includes an application module 105 and a composite message generation module 106. The application module 105 is preferably an electronic game application; however, the application module 105 can be any application providing images or other media that a sender wishes to send to a remote recipient.

The computer 100 further comprises a WinSock/WinInet component 108 or equivalent networking interface, a TCP/IP or other netware protocol subsystem 112, a network hardware and driver module 116, or alternatively a modem and modem driver 120, or both. The network hardware and driver module 116 provides an Ethernet connection to server 132.

The modem and driver 120 provides a telephone connection to server 132. In a preferred embodiment the computer 100 may be implemented on an Intel-based computer operating under Microsoft Windows 3.1, Windows 95, or WindowsNT operating system, or a SPARC-based computer operating under UNIX, or any other equivalent devices. The computer 100 is preferably capable of generating graphical representations, typically through the use of an internal graphics or rendering pipeline and associated hardware as is known in the art.

The computer 100(2) is similarly configured as computer 100(1) except that the application/messaging module 104 does not have to be present in computer 100(2). However, computer 100(2) has an electronic mail messaging program 145 or equivalent (e.g. browser based e-mail reader—such as HOTMAIL™) to receive and view electronic mail messages in the conventional manner. In a preferred embodiment, the electronic mail messaging program is capable of reading e-mails with embedded Hypertext Markup Language (HTML).

Figure 2:
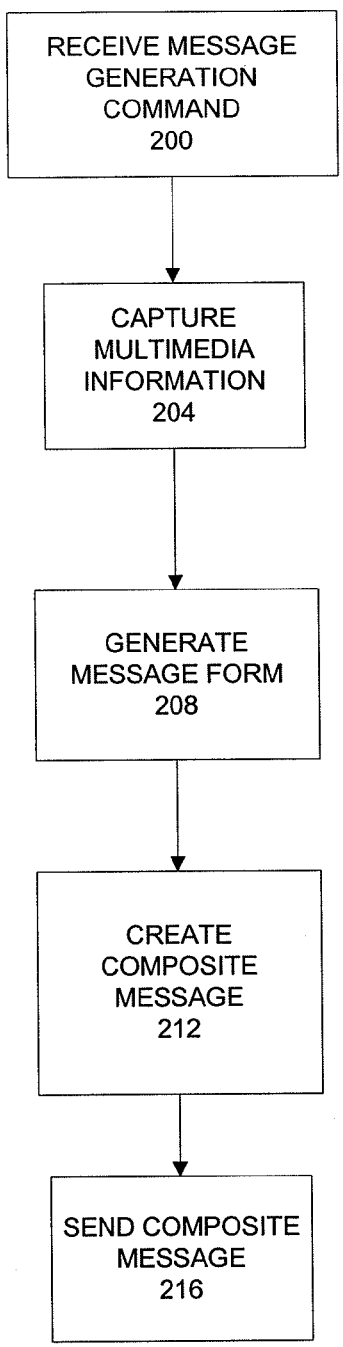
FIG. 2 is a flowchart illustrating generating a composite message.

FIG. 2 is a flowchart illustrating generating a composite message in accordance with the present invention. First, a composite message generation command is received 200 during execution of the application module 105 on computer 100(1), invoking the composite message generation module 106 and, in a preferred embodiment, pausing the execution of the game. This allows the sender to generate a composite message from any point during the execution of the application module 105 by activating the control. Alternatively, a key of the keyboard of the computer 100(1) is used to begin execution of the composite message generation module 106, for example, by pressing a function key or other key combination. Next, multimedia information is captured 204. Multimedia information, as discussed below, includes images, audio files, or any other media provided by the application module 105 and capable of being transmitted over the network 124. An example of an image 350 is shown in FIG. 3*b*.

Figure 7:
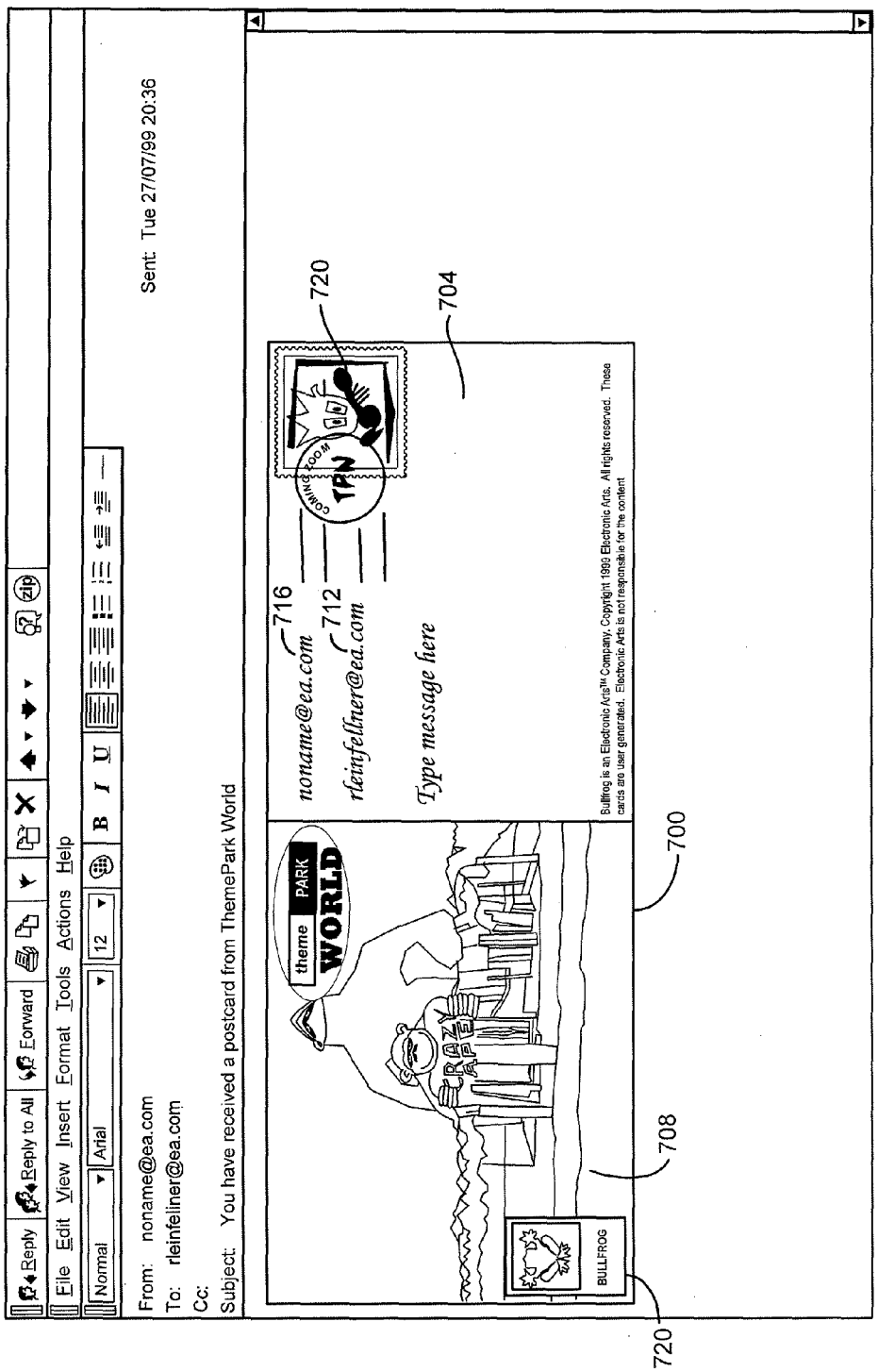
FIG. 7 is an illustration of receiving a composite message through a conventional e-mail program.

Then, a message form for containing the message is generated 208. The message form is used to receive message information and message text from the sender, including recipient data such as the recipient's e-mail address and name. One example of a message form 400 is shown in FIG. 4*b*. The message information may be text as shown in FIG. 4*b* or 4*c* or in an alternate embodiment may be recorded audio, video or a combination of any of these. Next, a composite message is created 212. The composite message combines the message information from the message form and the multimedia information into a single display. FIG. 7 illustrates one format of a composite message 700, an electronic postcard. However, any other message format in which multimedia and text information can be displayed is considered to be within the scope of the present invention. In one embodiment, the composite message itself is used to receive message information directly from the user without the intermediate message form 400.

Then, the composite message is sent 216 to the recipient via network 124. The recipient, as discussed above, does not require a copy of the application module 104 to view the message, but need only have a conventional electronic mail package supporting audio/image tracks. The recipient may now view the composite message 700 containing the multimedia and message information on the recipient's computer 100(2), as shown in FIG. 7. This allows the sender to effectively share the sender's experience with the recipient. The recipient may also save or print out the composite message 700. Responsive to sending the message, execution of the game is resumed. In one embodiment, the sender is displayed a notification within the game that the sent message has been received, as is accomplished in conventional e-mail applications, but as the messaging is part of the application module, display of such message does not interrupt or hinder the execution of the game. Thus, by incorporating the composite message generation with an application module, the user is able to send composite messages seamlessly from within an executing application without exiting the application or hindering the gameplay of the application if the application is an electronic game.

Figure 3A:
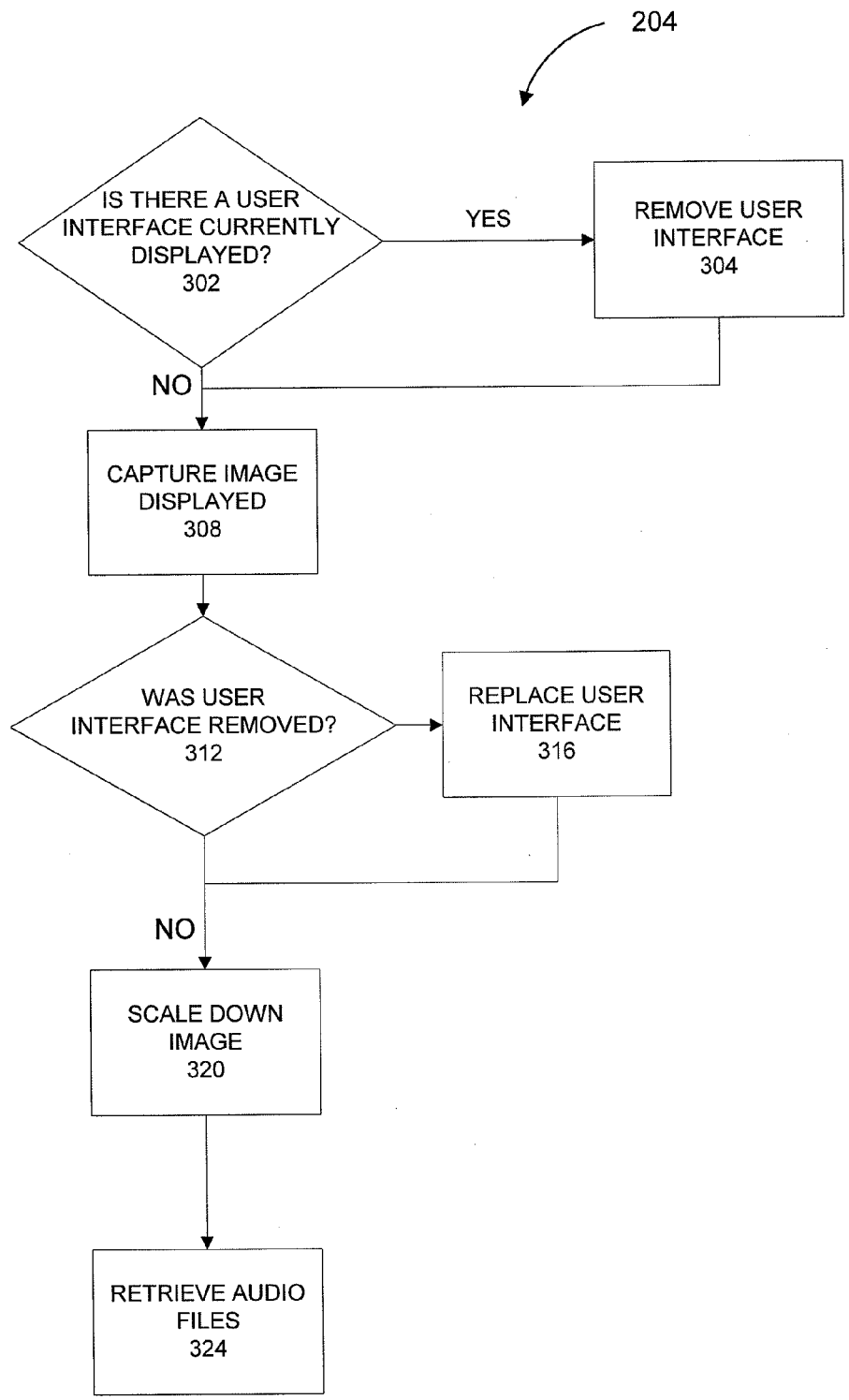
FIG. 3a is a flowchart illustrating an embodiment of capturing multimedia information.
Figure 3B:
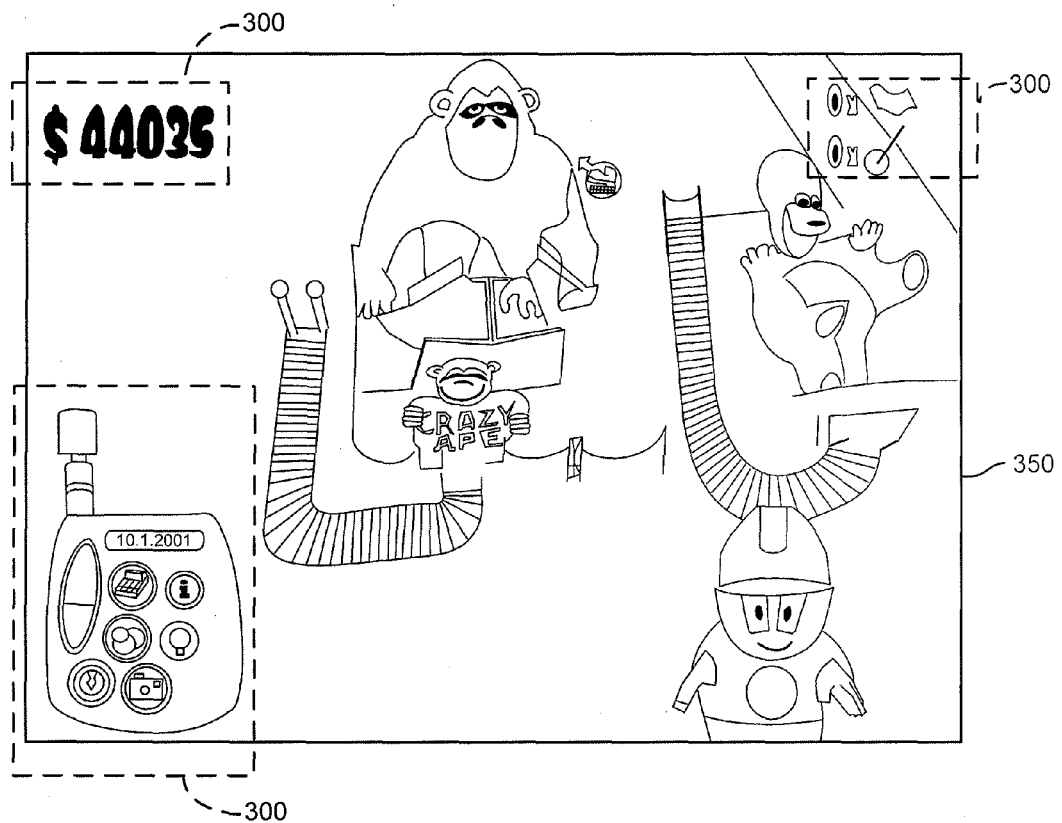
FIG. 3b is a screen shot of an image being captured.
Figure 3C:
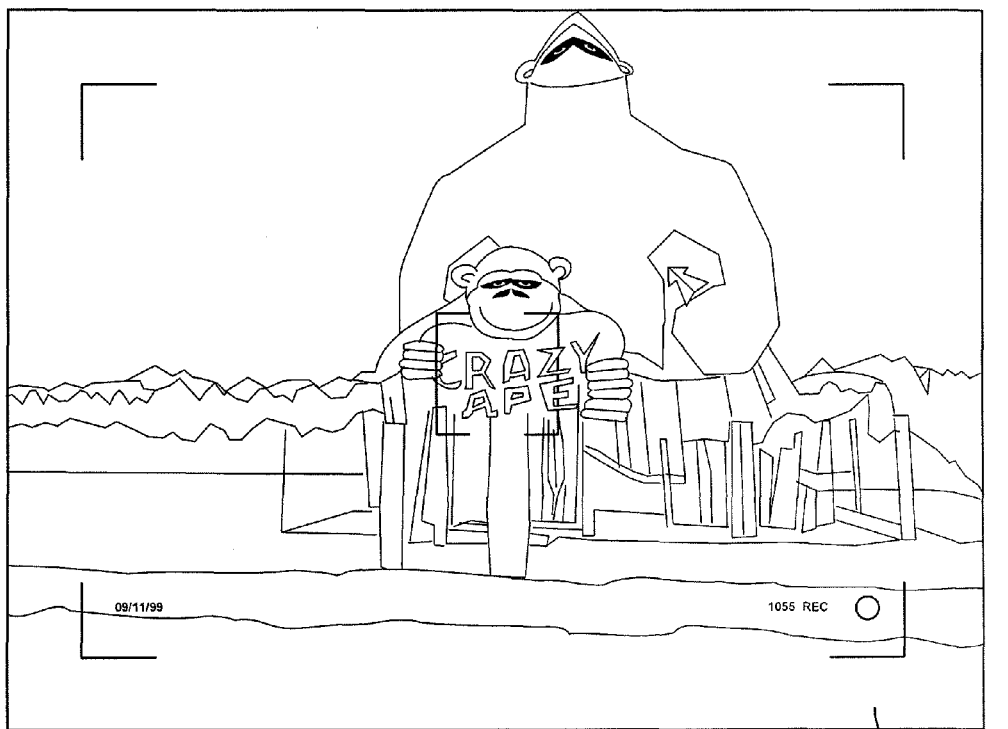
FIG. 3c is a screen shot of an image being captured with extraneous information removed.

FIG. 3*a* is a flowchart illustrating an embodiment of capturing multimedia information in accordance with the present invention. First, in a preferred embodiment, the composite message generation module 106 determines 302 whether extraneous user information elements or data is overlaying the image currently being displayed by the application module 105. Typically, application modules 105 display user interfaces or other graphical information 300 as part of the game (generically application) to communicate information to the player, as shown in FIG. 3*b*. In accordance with the present invention, any user interfaces or other extraneous graphical elements 300 generated as part of the application module 105 itself or generated by third party software, for example, the operating system or other applications that may be executing in the background, are removed 304 from the image prior to capture. This provides a complete, clear image for transmission as shown in FIG. 3*c*. As the user interfaces are typically rendered as one of the last layers by the rendering pipeline, in a preferred embodiment, the application module 105 instructs the pipeline to skip the user interface render stage for the image to be captured.

Next, the current image being displayed by the application module 105 is captured 308. This can be accomplished by several methods, for example, by retrieving data stored in a display buffer for the computer at the time the composite message generation button is selected and then storing the retrieved data in memory. In an embodiment in which user interface elements are removed, the composite message generation module 106 determines 312 whether a user interface was removed previously. This may also be accomplished by several methods, for example, by setting a status indicator indicating that a user interface was removed upon removal of the interface, and checking the status indicator after the image has been captured to determine whether a user interface should be reinstated. If a user interface was removed, the user interfaces are redisplayed 316, preferably by instructing the pipeline to resume rendering the user interface stage.

Next, the composite message generation module 106 scales 320 the captured image to a size appropriate for the composite message to be transmitted. In a preferred embodiment, the image is scaled down to a resolution 320×240 from the current screen resolution using conventional graphics techniques. In one embodiment, an interface is provided allowing the user to drag a window on the screen surface, allowing the user to choose the portion of the screen to be placed in the postcard. This embodiment provides Greater user control over the content of the composite message. The selected portion is then resized to fit an appropriate size for the composite message.

Then, the composite message generation module 106 retrieves 324 or captures audio information to accompany the image. The audio information can be a default audio clip stored by the application, for example, indicating a unique sound of the application or identifying the application, or the audio information can be an audio file that is currently being executed at the time of image capture. This embodiment increases the ability of the sender to capture the experience of the game or application module 105. Additionally, in one embodiment, a sender is given the opportunity to record an audio file to accompany the image, for example, recording a greeting by capturing the sender's voice through a microphone provided with the computer 100 or the application/messaging module 104.

Figure 4A:
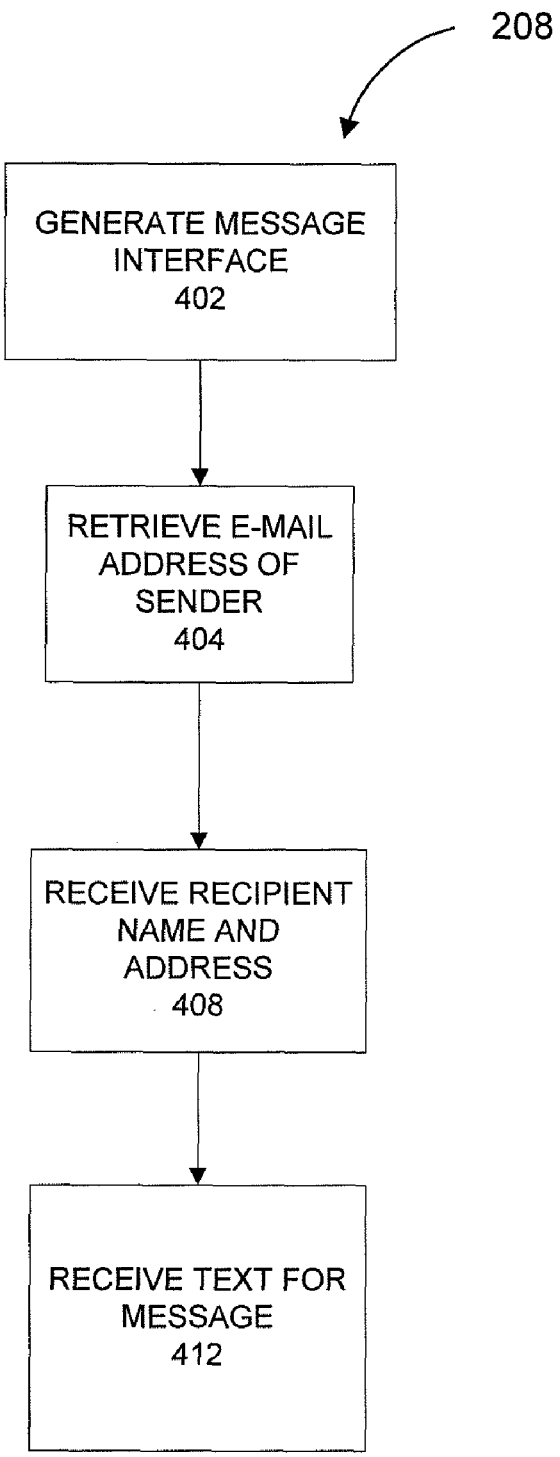
FIG. 4a is a flowchart illustrating an embodiment of generating a message form.
Figure 4B:
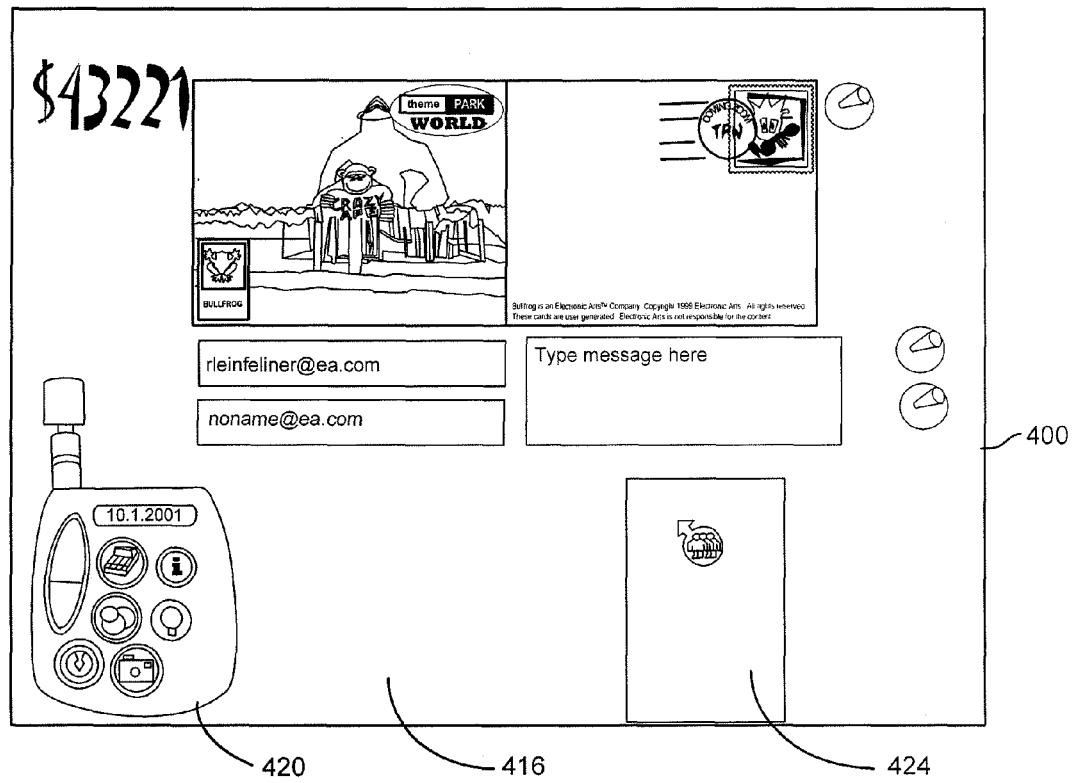
FIG. 4b is a screen shot of a first stage of a message form being created.
Figure 4C:
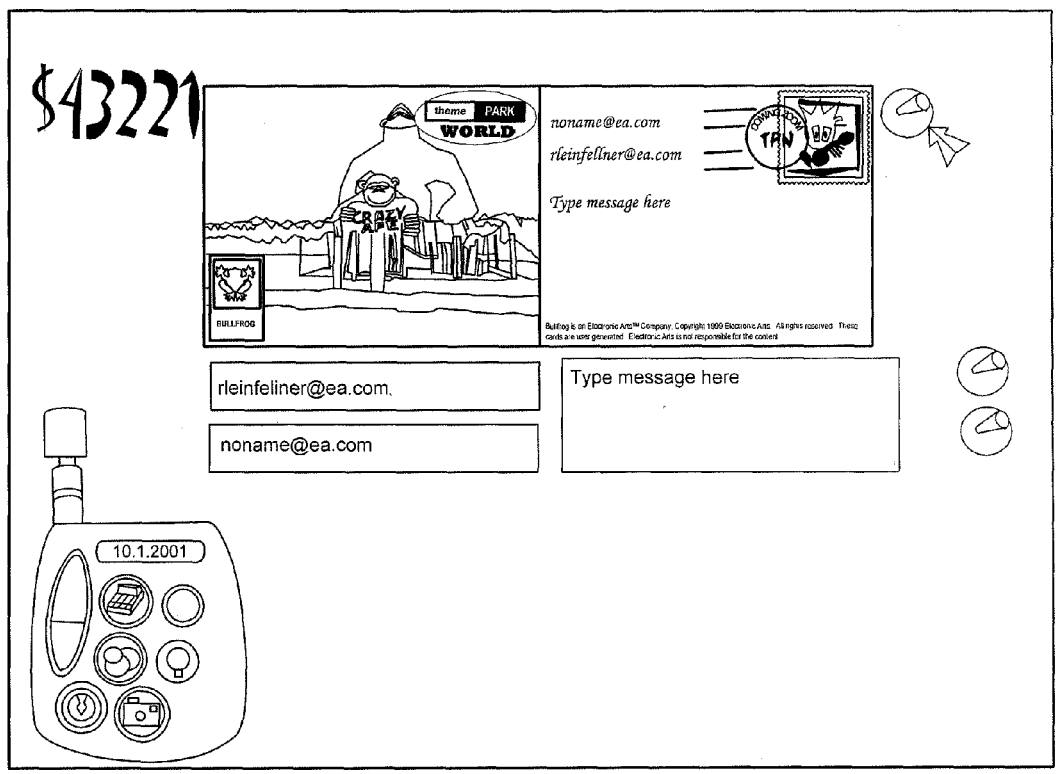
FIG. 4c is a screen shot of a second stage of a message form being created.

FIG. 4a is a flowchart illustrating an embodiment of receiving message information in accordance with the present invention. First, a message form 400 is generated 402. The message form 402 is an interface generated through conventional means that provides a "mechanism" or "means" through which the sender can enter the message information of the composite message. As discussed above, message information is typically the recipient's name, e-mail address, and a message text, as well as the sender's name and e-mail address. FIGS. 4b and 4c are screen shots of a preferred message form 400 within which message information can be entered by the sender, however, other forms for entry of information are considered to be within the scope of the present invention.

The message form 400 provides a entry field 416 to allow the sender to enter the sender's e-mail address. However, in a preferred embodiment, the sender's e-mail address is retrieved 404 from information stored by the application/messaging module 104, for example, when the sender registers the product with the manufacturer, or in an initial set-up screen for the application/messaging module 104. The composite message generation module 106 also displays an entry field 420 allowing the composite message generation module 106 to receive 408 the recipient's name and address. In one embodiment, the composite message generation module 106 displays a list of recipients to whom the sender has previously sent messages, and allows the sender to choose a recipient from the displayed list. The composite message generation module 106 also displays an entry field 424 allowing the composite message generation module 106 to receive message text. The message text is simply the personal text greeting the sender wishes to accompany the multimedia information.

Figure 5:
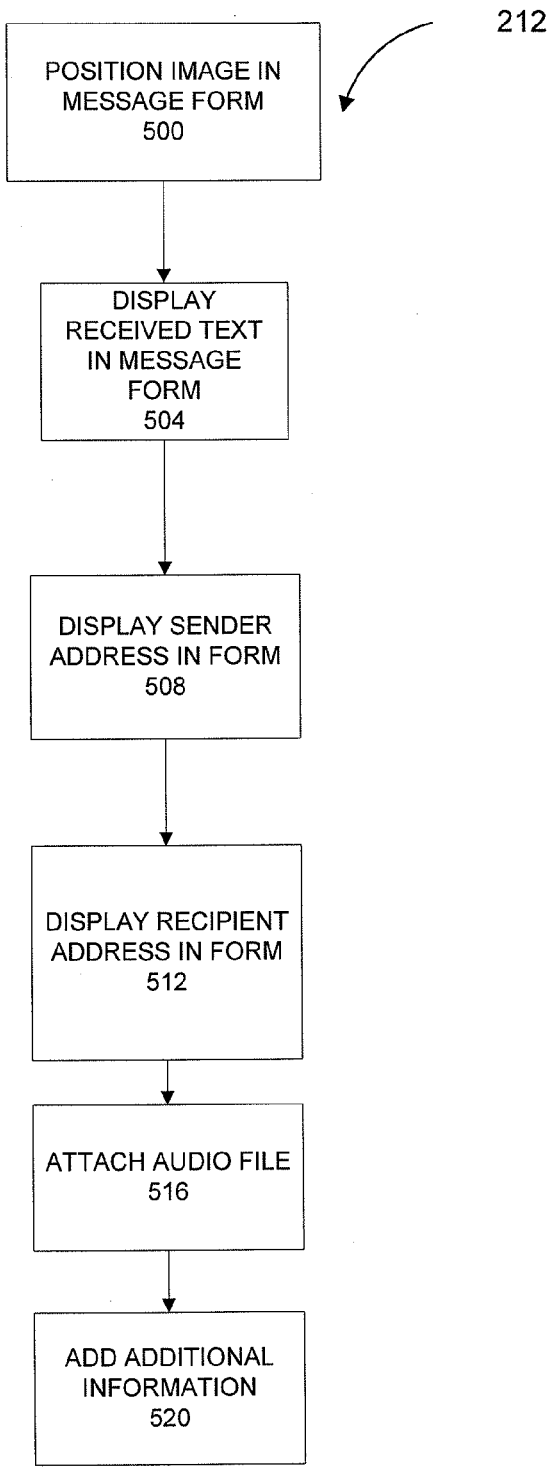
FIG. 5 is a flowchart illustrating an embodiment of creating a composite message.

FIG. 5 is a flowchart illustrating an embodiment of creating a composite message in accordance with the present invention and is described with respect to FIGS. 4c and 7. First, the composite message generation module 106 positions 500 the captured image 500 within the message form. As shown in FIG. 7, in an electronic postcard embodiment of the present invention, the composite message generation module 106 displays the image 300 in an image half 708 of the message 700, as in a traditional postcard. Next, the composite message generation module 106 displays 504 message text in the composite message 700, and as shown in FIG. 4c, in the electronic postcard embodiment, the message text is displayed in the second, text, half 704 of the postcard. Then, the composite message generation module 106 displays 508 the sender's address in a sender information area 712 and displays 512 the recipient's address in a recipient data area 716. If an audio file is to be attached, the composite message generation module 106 attaches 516 the audio file to the message form and displays an audio icon on the message form indicating the presence of the audio file. Then, the composite message generation module 106 adds 520 additional information 720 to the message form. For example, in the embodiment shown in FIG. 4c, a corporate logo is provided for display on the message form providing a means for advertising to the manufacturer of the application module 105. Additionally, in this embodiment, a postmark graphic and a stamp image are provided to complete the "postcard" image. Any other information can also be added, for example audio files or personal images selected by the sender, or other graphics to create a different form within which to present the sender's message and the selected multimedia information.

Figure 6:
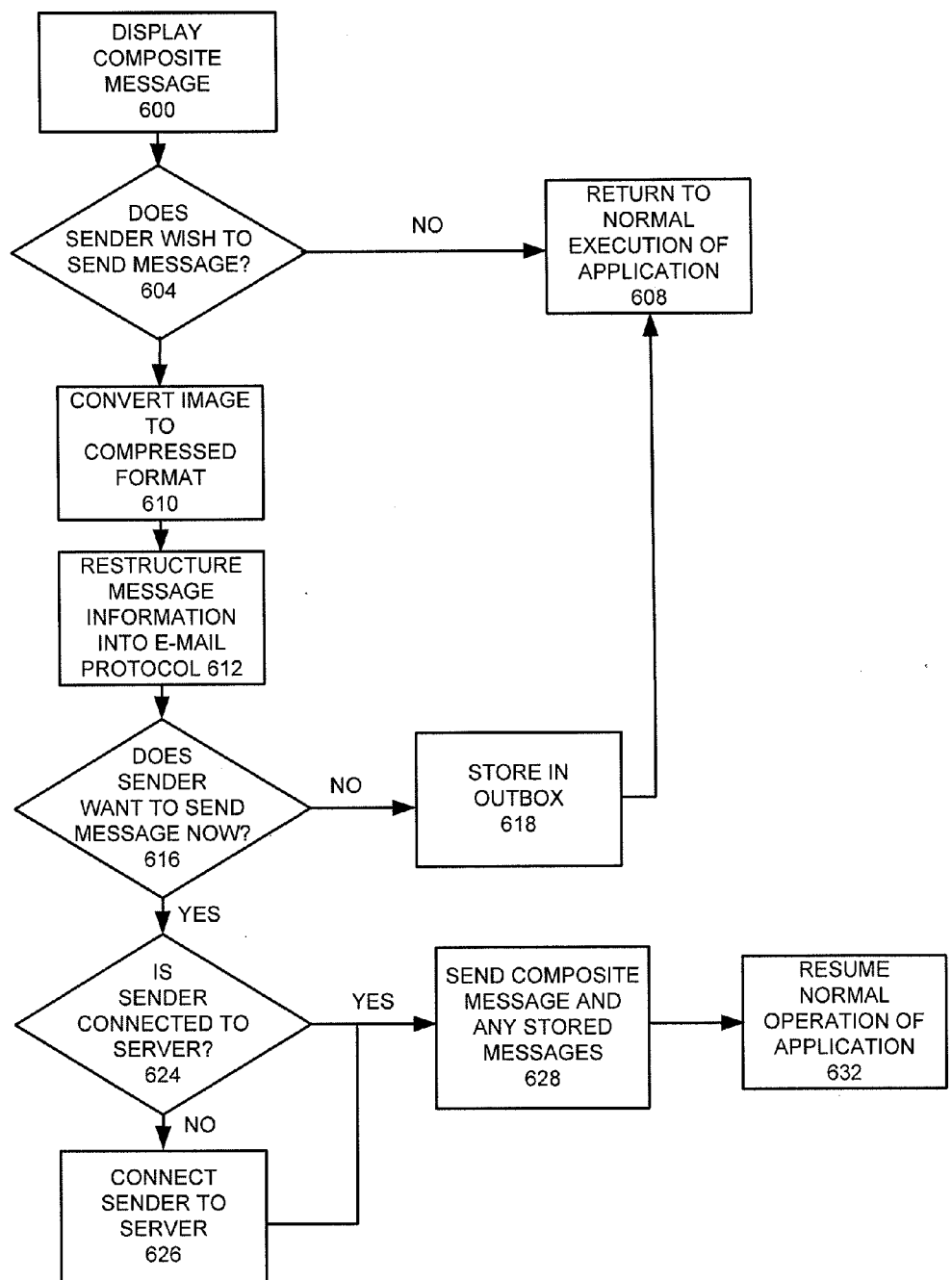
FIG. 6 is a flowchart illustrating an embodiment of sending a composite message.

FIG. 6 is a flowchart illustrating an embodiment of sending a composite message in accordance with the present invention. First, after the sender completes entry of data into the message form, the composite message generation module 106 displays 600 the composite message to the sender. In this embodiment, the option of sending the message is displayed 604, or canceling the message. If the sender does not want to send the message, the composite message generation module 106 returns 608 control to the application module 105, and the execution resumes from the point at which the sender initiated the composite message generation module 106 originally. If the sender does want to send the message, the image is converted 610 to a compressed format, for example, in JPEG, to prepare the image for transmission. Any other means of compression could also be used to compress the image suitably for transmission.

Next, the message information is restructured 612 to comply with an electronic mail protocol. In one embodiment, the basis for the email is an HTML stub file which contains an HTML <img> tag for the image data. The ASCII e-mail message is created by wrapping the HTML in MIME (multipurpose internet mail extension) format. Any other method for transmitting text and non-text files via Internet e-mail may also be used in accordance with the present invention. Using the MIME method, the composite message is encoded using base 64 coding on the transmission end, and is decoded using the inverse process at the receiving end. A MIME header is added to the composite message that indicates the type of data within the message and the encoding method used. In this embodiment, a MIME message with multipart/related content type is used, having subparts of text/html and image/jpeg to accommodate the text and image portions of the composite message. The stub HTML code becomes the text/html part of the MIME encoded message, and, as discussed above, the captured image is encoded using base 64 encoding, and becomes the image/jpeg part of the MIME encoded message. Other content allowable in HTML could also be included as is known to those of ordinary skill in the art.

The composite message generation module 106 then displays 616 a message asking the sender whether the message should be sent now or later. If the sender chooses to defer the message, the completed e-mail is stored 618 until the next time the sender is connected online. The e-mail may be stored on the sender's computer 100(1), in memory, on a local or external hard drive, or, in a preferred embodiment, stored in an outbox of the sender and queued for delivery the next time the sender activates the messaging application. Any other suitable means for storing information could also be used.

If an immediate send is requested, then the composite message generation module 106 determines 624 whether the sender has an existing online connection. This is accomplished by querying the operating system of the computer 100(1), or by other conventional means. If the sender is not connected, the composite message generation module 106 provides the sender the option to connect 626 to a server 132. In accordance with the present invention, the connection is made without exiting the application/messaging module 104. In an alternate embodiment, if there is no connection to the server 132, the message is automatically stored for later delivery. For example, the message could be stored in the outbox, and when the sender is connected to the server 132 next, a reminder message is displayed to remind the sender that an unsent message is in the sender's outbox. If the connection is made or if the connection was already existing, the message and any stored messages are sent 628. In one embodiment, the composite message generation module 106 disconnects the sender after sending the message. Then, the composite message generation module 106 restores the execution of the application module 105 at the point at which the sender initiated the message sending feature in accordance with the present invention.

The composite message is sent through a TCP/IP connection to a server 132, where it is relayed to the recipient in the conventional manner. Any mail server that implements SMTP or other compatible format can receive the composite message. If the message is transmitted over a local-area or other type of network, other connections may be used to transmit the message.

FIG. 7 is an illustration of a composite message received through a conventional e-mail program. The recipient is not required to have the application/messaging module 104 stored on their computer 100(2); all the recipient should have is an email viewer capable of reading emails with embedded HTML. In an alternate embodiment the composite message is sent as an attachment to an e-mail, for example, as an attached .gif file.

Figure 8:
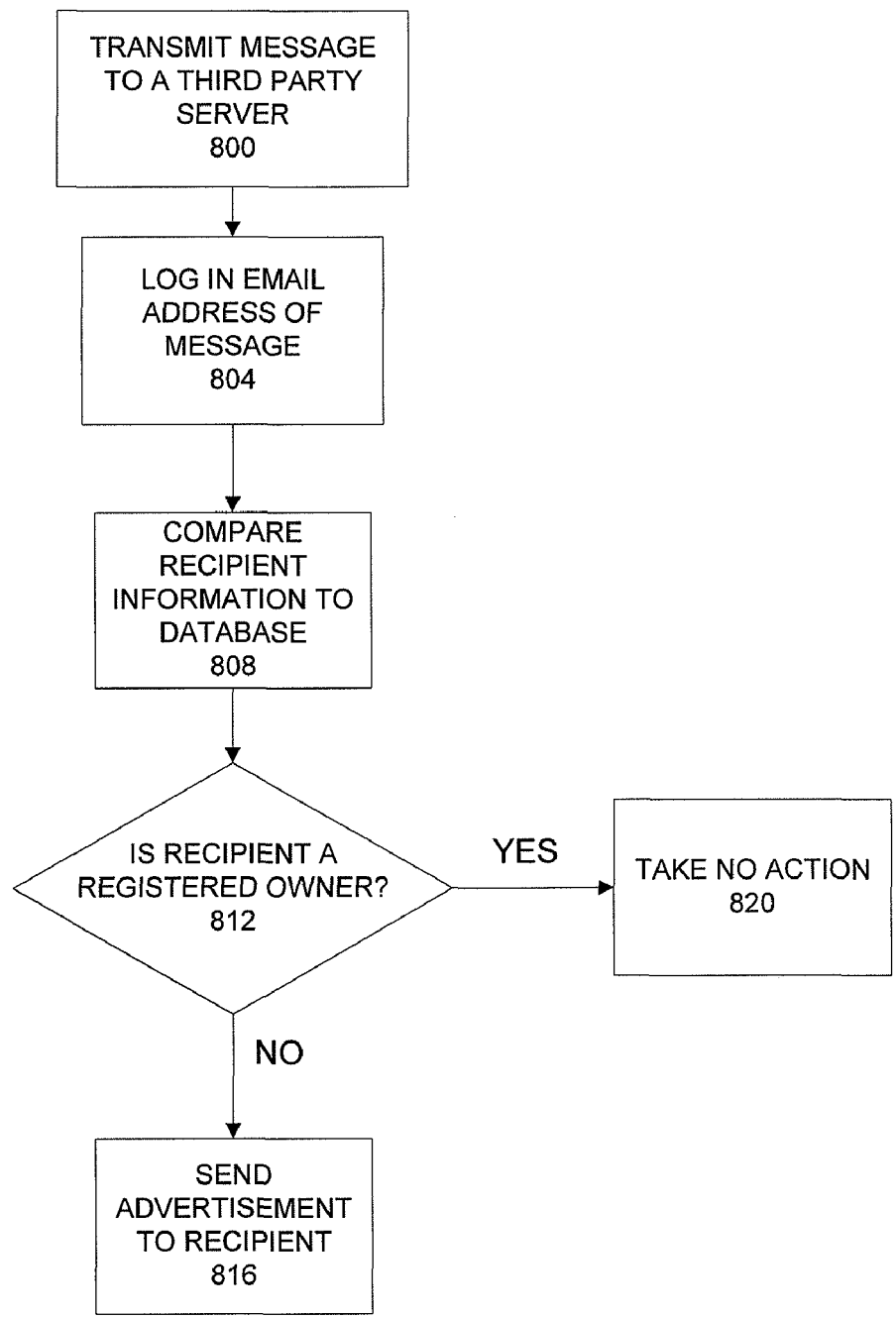
FIG. 8 is a flowchart illustrating a method of providing targeted advertisements.

In one embodiment, as shown in FIG. 8, messages transmitted by users of the application/messaging module 105 are transmitted 800 to a specific server maintained by a third party interested in providing marketing or advertising services. In this embodiment, the third party logs 804 in the electronic mail address of the recipient of the message. Once stored, the third party compares 808 the recipient's identifying information with a database of registered owners of the application/messaging module 104. If the third party determines 812 that the recipient is not a registered owner, the third party sends 816 marketing information to the recipient's electronic mail address. This allows the third party to target customers who are likely purchasers of the application/messaging module because the recipient is acquainted with the product through the senders composite message, and the recipient may have similar interests as the sender. Therefore, the composite messaging system also provides a powerful targeted advertising feature for the benefit of the manufacturer of the application/messaging module 104.

In one embodiment the manufacturer of the application/messaging module 104 maintains the server 132; however, in an alternate embodiment, the server 132 is maintained by a third party who provides marketing and advertising services to the manufacturer of the application module 105. Alternatively, the manufacturer maintains the server 132, but forwards composite messages to the third party to have the third party evaluate and provide advertising if appropriate. In yet another embodiment, the composite messages are generated by the manufacturer of the application/messaging module 104 or a third party working with the manufacturer, and are sent as advertisements to targeted customers.

Thus, in accordance with the present invention, users of an application module 105 are allowed to interact with their fellow users and share the in-game or application experience. The composite messages are as unique as each user's gaming experience. This feature allows a community to be built centered around a specific application module 105 and allows the manufacturer to establish and maintain brand differentiation and brand loyalty to an application module 105 by providing the interactive snapshots of the application module 105 to other users and potential users of the application module 105.

The invention claimed is:

1. A method of sending an electronic message from within a game application to an intended recipient over a network, comprising:
   receiving a user input selecting an image generated by the game application;
   generating a message form from within the game application for receiving message information;
   combining the selected image and the message information into a composite message; and
   sending the composite message as an email message from within the game application to the intended recipient over the network without using a separate, external email application;
   sending a message containing intended recipient data to a predetermined recipient to allow the predetermined recipient to identify potential users of the game application;
   receiving the message;
   identifying the intended recipient based on the intended recipient data;
   determining whether the intended recipient is an owner of the game application: and
   responsive to the intended recipient not being an owner of the game application, sending advertising material regarding the game application to the intended recipient.

2. The method of claim 1 wherein the message information further comprises address information for the intended recipient.

3. The method of claim 1 wherein the message information further comprises message text to be transmitted to the intended recipient.

4. The method of claim 1 further comprising:
   receiving an address specifying a recipient of the message; and
   attaching the address to the composite message; and
   wherein sending comprises sending the composite message to the specified address.

5. The method of claim 1 further comprising:
   receiving a generate message command; and
   responsive to receiving the generate message command, pausing execution of the application.

6. The method of claim 5 further comprising:
   responsive to a message containing the image being transmitted, resuming execution of the application.

7. The method of claim 1, wherein the message further includes sender data.

* * * * *